(12) United States Patent
Morgan

(10) Patent No.: US 10,360,122 B2
(45) Date of Patent: Jul. 23, 2019

(54) TRACKING CLOUD INSTALLATION INFORMATION USING CLOUD-AWARE KERNEL OF OPERATING SYSTEM

(75) Inventor: Christopher Edwin Morgan, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 995 days.

(21) Appl. No.: 13/149,750

(22) Filed: May 31, 2011

(65) Prior Publication Data
US 2012/0311571 A1 Dec. 6, 2012

(51) Int. Cl.
*G06F 11/30* (2006.01)
*G06F 9/455* (2018.01)

(52) U.S. Cl.
CPC ...... *G06F 11/3003* (2013.01); *G06F 9/45558* (2013.01); *G06F 11/3051* (2013.01); *G06F 2009/45591* (2013.01); *G06F 2201/875* (2013.01)

(58) Field of Classification Search
CPC ............. G06F 9/45533; G06F 9/45537; G06F 9/45545; G06F 9/5077
See application file for complete search history.

(56) References Cited

U.S. PATENT DOCUMENTS

| | | |
|---|---|---|
| 6,463,457 B1 | 10/2002 | Armentrout et al. |
| 7,313,796 B2 | 12/2007 | Hamilton et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037089 A1* | 2/2003 | Cota-Robles et al. ............ 709/1 |
| 2003/0037258 A1 | 2/2003 | Koren |
| 2003/0110252 A1 | 6/2003 | Yang-Huffman |

(Continued)

OTHER PUBLICATIONS

Unknown Authors, "What is an OS kernel? How does it differe from an operating system?", stackoverflow.com/questions/2013937/what-is-an-os-kernel-how-does-it-differ-from-an-operating-system, Jan. 6, 2010.*

(Continued)

*Primary Examiner* — Wynuel S Aquino
(74) *Attorney, Agent, or Firm* — Lowenstein Sandler LLP

(57) ABSTRACT

Embodiments relate to systems and methods for tracking cloud installation information using a cloud-aware kernel of operating system. A guest operating system can be hosted in a cloud-based network which to support a set of virtual machines operating in that set of host clouds. The guest operating system can be configured with resources in the kernel to detect and manage the identity of the cloud in which the operating system is installed, as well as the duration of operation of the operating system and potentially, usage and other details of the set of virtual machines and their associated guest operating systems. Because the cloud identification and other data capture occurs directly in a cloud-aware kernel of the guest operating system, security and responsiveness are enhanced. The resulting set of kernel hosting data can be securely exported to a metering system or other platform for billing or other purposes.

20 Claims, 5 Drawing Sheets

(56) References Cited

U.S. PATENT DOCUMENTS

| | | |
|---|---|---|
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0044169 A1* | 2/2005 | Arbeitman et al. .......... 709/217 |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104222 A1* | 5/2008 | Brans et al. .................. 709/224 |
| 2008/0104608 A1 | 5/2008 | Hyser et al. |
| 2008/0177839 A1* | 7/2008 | Chang et al. ................. 709/205 |
| 2008/0216796 A1 | 9/2008 | Lam et al. |
| 2008/0240150 A1 | 10/2008 | Dias et al. |
| 2009/0012885 A1 | 1/2009 | Cahn |
| 2009/0024994 A1* | 1/2009 | Kannan ............... G06F 9/45533 718/1 |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sager et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1* | 12/2009 | Ferris .................. G06F 9/45558 718/1 |
| 2009/0300608 A1* | 12/2009 | Ferris et al. ....................... 718/1 |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0175063 A1* | 7/2010 | Ciano .................. G06F 9/4862 718/1 |
| 2010/0217850 A1 | 8/2010 | Ferris |
| 2010/0217864 A1 | 8/2010 | Ferris |
| 2010/0217865 A1* | 8/2010 | Ferris ........................... 709/226 |
| 2010/0220622 A1 | 9/2010 | Wei |
| 2010/0299366 A1* | 11/2010 | Stienhans ............. G06F 9/5072 707/803 |
| 2010/0306354 A1 | 12/2010 | DeHaan et al. |
| 2010/0306377 A1 | 12/2010 | DeHaan et al. |
| 2010/0306379 A1* | 12/2010 | Ferris ........................... 709/226 |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1* | 3/2011 | Dehaan ......................... 709/226 |
| 2011/0055398 A1 | 3/2011 | DeHaan et al. |
| 2011/0055588 A1 | 3/2011 | DeHaan |
| 2011/0113136 A1* | 5/2011 | Phaal .................. G06F 11/3476 709/224 |
| 2011/0131335 A1 | 6/2011 | Spaltro et al. |
| 2011/0246992 A1* | 10/2011 | Kern ............................. 718/100 |
| 2011/0295727 A1* | 12/2011 | Ferris et al. ..................... 705/34 |
| 2011/0307886 A1* | 12/2011 | Thanga ................ G06F 9/5077 718/1 |
| 2012/0054731 A1* | 3/2012 | Aravamudan et al. ........ 717/170 |
| 2012/0054742 A1* | 3/2012 | Eremenko et al. ............... 718/1 |
| 2012/0066375 A1* | 3/2012 | Phaal ........................... 709/224 |
| 2012/0072318 A1* | 3/2012 | Akiyama ............. G06Q 40/12 705/30 |
| 2012/0159483 A1* | 6/2012 | He et al. .......................... 718/1 |
| 2013/0066940 A1* | 3/2013 | Shao ............................ 709/201 |
| 2014/0040656 A1* | 2/2014 | Ho ....................... G06F 9/5077 714/3 |

OTHER PUBLICATIONS

"rBuilder and the rPath Appliance Platform", 2007 rPath, Inc., www.rpath.com, 3 pgs.

White Paper—"rPath Versus Other Software Appliance Approaches", Mar. 2008, rPath, Inc. www.rpath.com, 9 pgs.

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud ComputingEnvironments", U.S. Appl. No. 12/714,099, filed Feb. 26, 2010.

(56) References Cited

OTHER PUBLICATIONS

Ferris et al, "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, fired Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controiled Resources in Cloud Environments Via a Resource Specification Language Wrapper", U.S. Appl. No. 12/790,294, flied May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 953,718, filed Nov. 24, 2010.
Ferris et al., "Systems and Methods for Matching a Usage History to a New Cloud" U.S. Appl. No. 12/963,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for identifying Service Dependencies in a Cloud Deployment", U.S. Appl. No. 12/952,857, filed Nov. 23, 2010.
Ferris et al., "System and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al. "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Raised Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis" U.S. Appl. No. 13/037,359, filed Mar. 1, 2011.
Morgan, "Systems and Methods for Generating Markeplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Silding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Barbara Higgins et al., Oracle® Enterprise Manager Ops Center, User's Guide 11g Release 1 Update 3 (11.1.3.0.0) Nov. 2011.

\* cited by examiner

TRACKING CLOUD INSTALLATION INFORMATION USING CLOUD-AWARE KERNEL OF OPERATING SYSTEM

FIELD

The invention relates generally to systems and methods for tracking cloud installation information using a cloud-aware kernel of operating system, and more particularly, to platforms and techniques for a cloud-aware kernel of an operating system that can be installed in one or more host clouds to operate virtual machines and other entities, and which kernel can automatically detect the identity and type of cloud in which it is installed, as well as the duration of its operation in the host cloud or clouds.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the installation of a guest operating system in a host cloud or clouds, based upon which operating system layer guest operating systems for virtual machines can be instantiated, in known cloud management platforms and operating systems, the operating system itself is not configured to detect the host cloud in which it is installed, nor to maintain a record of how long the operating system has been operating. Due to the lack of operating system self-awareness, administrators wishing to configure the operating system for particular cloud resources or conditions, or to track the operation of the guest operating system over time for billing or other purposes, may need to resort to installing third-party services or tools on top of the guest operating system, or on the host operating system or hypervisor, in order to acquire similar information. Third-party tools or services may, however, present security risks to sensitive operating system or usage information, and because they may operate above the kernel, may be able to be switched off by users or others without the knowledge of the administrator.

It may be desirable to provide systems and methods for tracking cloud installation information using a cloud-aware operating system kernel, in which a guest operating system for a cloud-based implementation can be configured with a kernel that has a native cloud-awareness capability to identify the host cloud in which it is installed or operates, as well as to track the duration of operation of the operating system or any child process, and/or to capture other data directly in the kernel itself. This information can in turn be made available either directly to a "user" of the operating system, which could include third party services or agents, but which could also be broadcast for remote consumption by other cloud management systems.

DESCRIPTION

Figure 1:
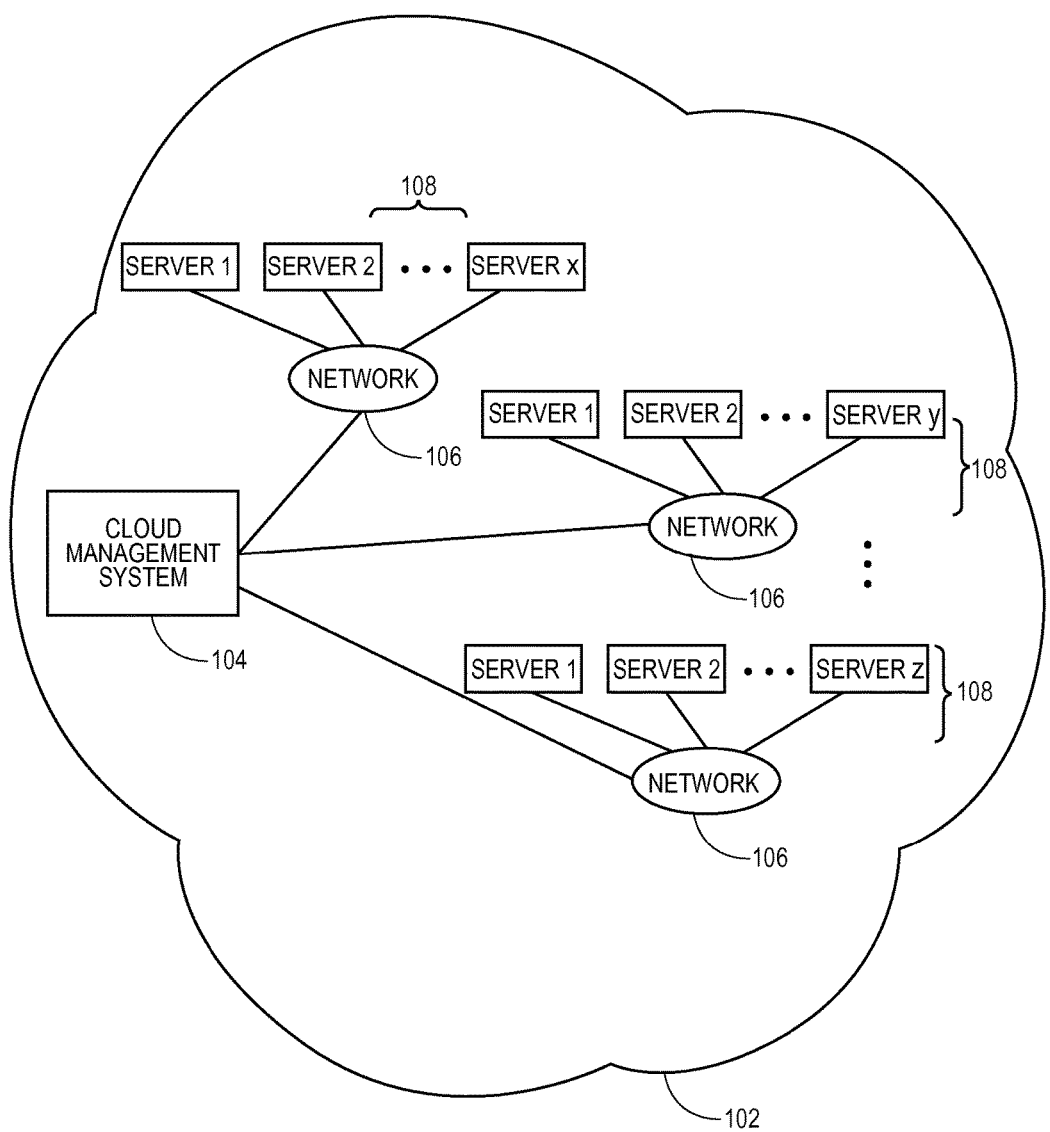
FIG. 1 illustrates an overall cloud system architecture in which various aspects of systems and methods for tracking cloud installation information using a cloud-aware kernel of operating system can be implemented, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
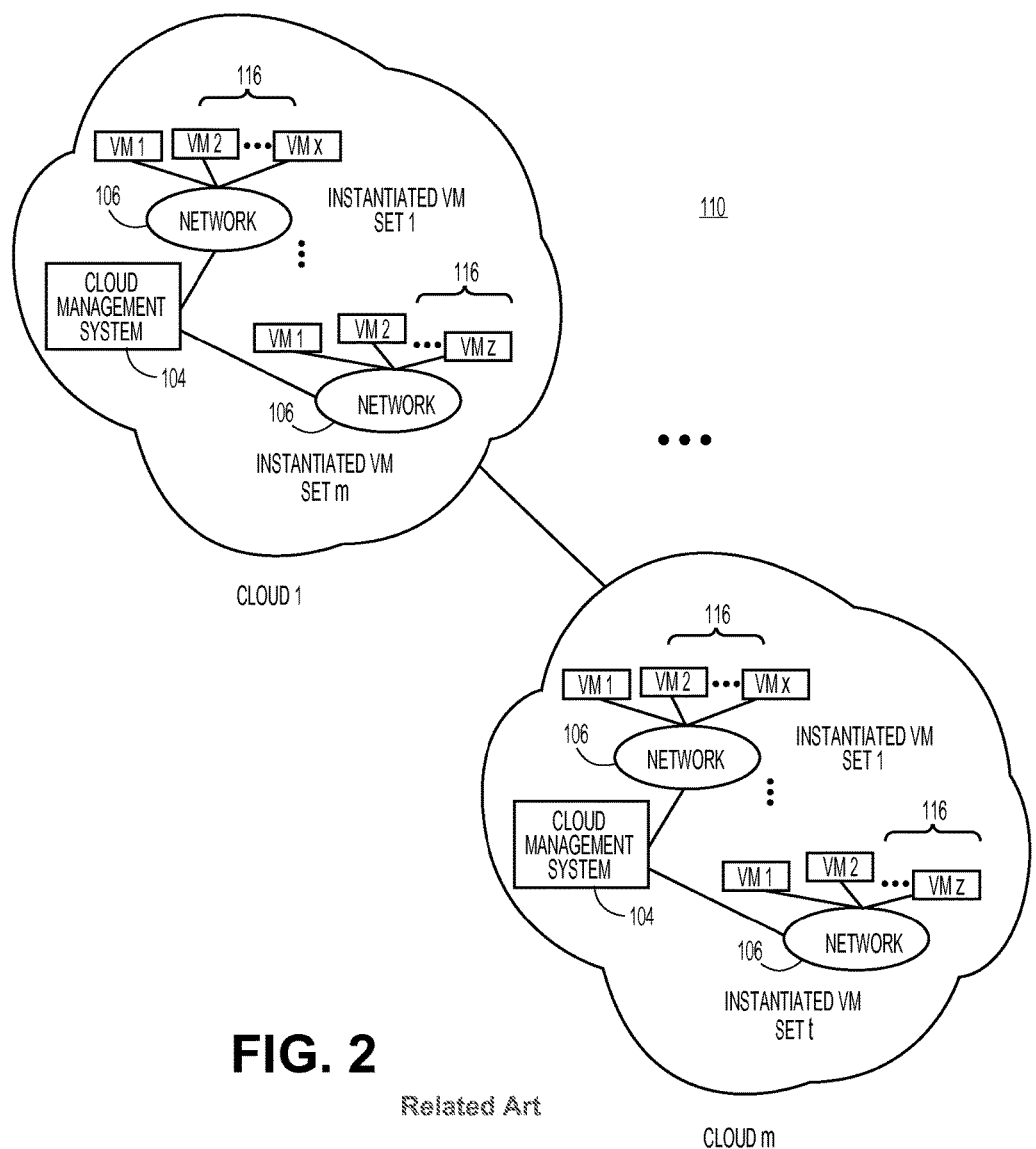
FIG. 2 illustrates an overall cloud system architecture in which various aspects of systems and methods for tracking cloud installation information using a cloud-aware kernel of operating system can be implemented, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiated virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals.

The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Aspects of the present teachings relate to platforms and techniques in which the kernel of a guest operating system installed and operating in a host cloud-based network can be equipped or configured with a set of cloud-awareness resources or capabilities. The cloud-aware operating system kernel can be configured to contain capabilities and/or services to be able to detect and identify the identity, type, or other information of the cloud in which the guest operating system is installed, directly at the kernel level and without a need to invoke third-party applications or services located outside of the kernel. The guest operating system can thereby establish the identity of the cloud in which it is installed, and for instance automatically configure or adjust operating parameters, services, application programming interfaces, and/or other resources to match the cloud host environment in which it finds itself located. In aspects, the kernel and associated tools can track the duration or length of time that the guest operating system has been operating in the identified cloud, to export that information to external consumers such as third-party billing or metering applications, or others.

Figure 3:
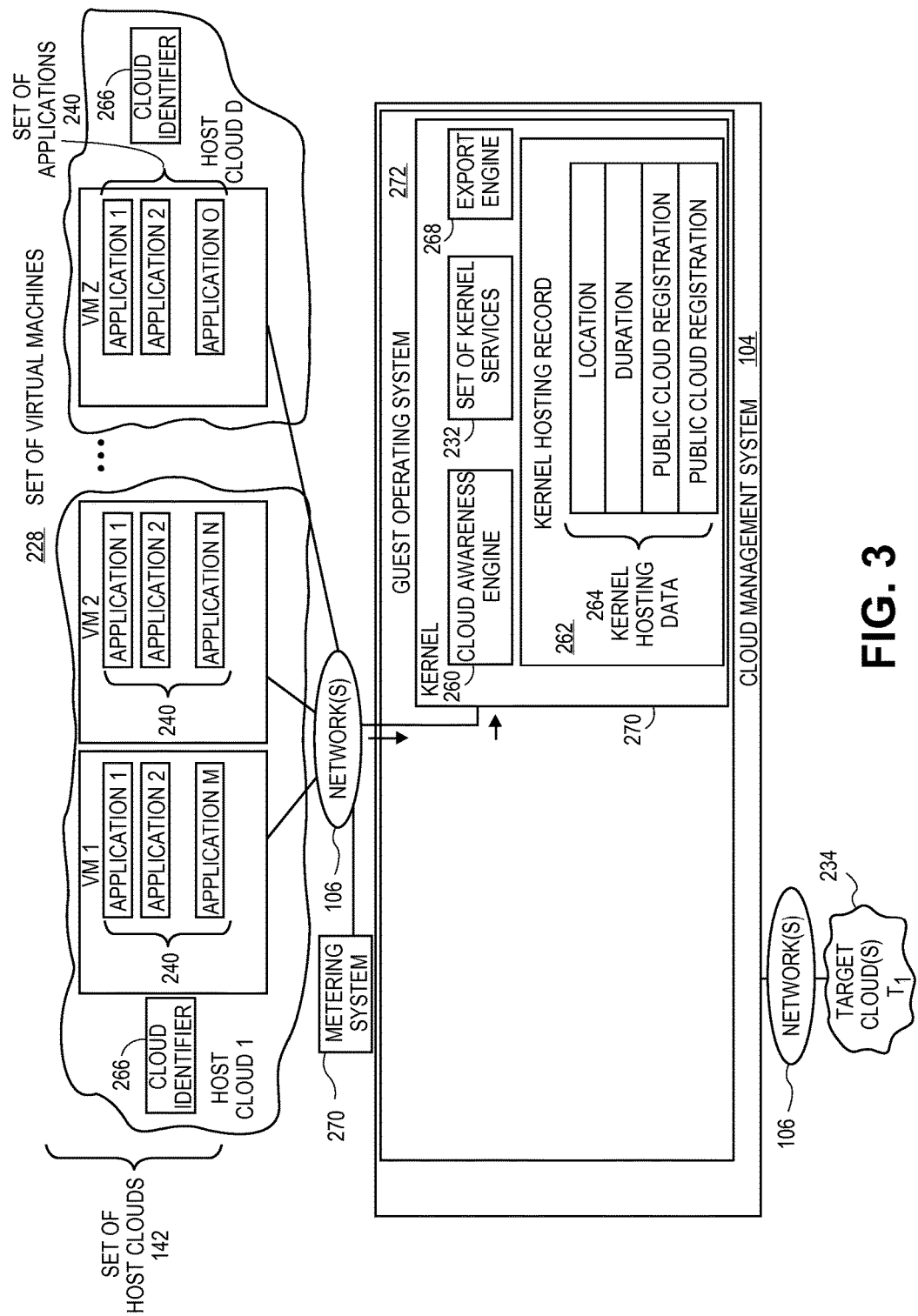
FIG. 3 illustrates a network configuration in which systems and methods for tracking cloud installation information using a cloud-aware kernel of operating system can be implemented, including kernel-based cloud awareness capabilities.

Consistent with the foregoing, in general, FIG. 3 shows an illustrative network configuration in which systems and methods for tracking cloud installation information using a cloud-aware operating system kernel can be implemented, according to various embodiments. In embodiments as shown, one or more users can operate a set of virtual machines 228 in a set of host clouds 142, for instance, by subscribing to resources in the set of host clouds 142 to support, provide, and/or execute the set of virtual machines 228 according to service level agreements (SLAs) and/or other terms or arrangements. In aspects, each virtual machine in the set of virtual machines 228 can have a set of applications 240 installed or instantiated in that machine, such as browsing, messaging, word processing, spreadsheet, and/or other applications or application types. According to aspects, each virtual machine in the set of virtual machines 228 can operate using an instance of a guest operating system 272 assigned to or supporting that machine in the associated cloud-based network in the set of host clouds 142. Each host cloud in the set of host clouds 142 can be supported, hosted, and/or executed in or by a cloud management system 104 associated with the set of host clouds 142. In aspects, the guest operating system 272 instantiated in one or more clouds in the set of host clouds can be or include, for instance, the Red Hat Enterprise Linux™ operating system available from Red Hat, Inc., Raleigh, N.C., or other operating systems or platforms. In aspects, the each instance of the guest operating system 272 can serve or function to support the operation of an associated virtual machine set of virtual machines 228 operating in the set of host clouds 142.

In aspects as shown, the kernel 270 of the guest operating system 272 can be configured or equipped with a set of services or resources including a set of kernel services 232 to support task scheduling, file support, and other operating system services for an associated virtual machine and/or other entities, as well as a cloud awareness engine 260 configured to perform discovery and tracking operations in the cloud environment in which the guest operating system 272 is installed. The cloud awareness engine 260 and/or other logic, application, platform, and/or service can be configured to build, access, update, and/or maintain a kernel hosting record 262 to directly capture and store information related to the location, duration, operation, and/or other details related to the use and activity of guest operating system 272 in one or more host clouds in the set of host clouds 142. The kernel hosting record 262 can be configured to store a set of kernel hosting data 264, including for instance cloud location information, operating system duration information reflecting the period or length of time over which the guest operating system 272 and/or associated virtual machines or applications have been executing and/or in use, public cloud registration information, private cloud registration information, and/or other data related to the operation of guest operating system 272 in the set of host clouds 142 or otherwise. In aspects as shown, the cloud awareness engine 260 can be integrated, hosted, and/or embedded directly in the kernel 270 of the guest operating system 272 itself, without a requirement for additional layers of software to perform cloud identification and operating system management tasks.

In terms of identifying the actual cloud or clouds in the set of host clouds 142 in which the guest operating system 272 is installed or operates, the cloud awareness engine 260 and/or other logic, application, platform, and/or service can be configured to communicate with one or more clouds in the set of host clouds 142 to interrogate those clouds for a respective cloud identifier 266. The cloud identifier 266 can be an identifier or code stored in or associated with each cloud in the set of host clouds 142 and/or other clouds, to identify the vendor, type, software compatibilities, subscription terms, resource capacities, and/or other data related to the cloud network environment supplied or offered by each cloud. In aspects, the cloud identifier 266 can represent a unique identifier or code assigned to all public clouds or other types of clouds, for instance, through a public registry maintained by one or more cloud vendors and/or other organizations. According to aspects, the cloud awareness engine 260 and/or other logic, application, platform, and/or service can request, interrogate, access, and/or otherwise acquire the cloud identifier 266 for the cloud in which it is installed, for instance by querying the cloud management system 104 associated with that cloud, and/or interrogating other entities, platforms, sources, and/or services. In implementations, the cloud awareness engine 260 and/or other logic, application, platform, and/or service can communicate with the cloud management system 104 and/or other entities via secure channels and/or private channels, such as encrypted channels or other connections.

In aspects, the cloud awareness engine 260 and/or other logic, application, platform, and/or service can likewise request or acquire other data directly or internally from the host cloud or cloud(s) in which it is installed or operates, including duration information as part of the set of kernel hosting data 264. The duration information can reflect the length, amount, and/or period of time over which the guest operating system 272, set of applications 240, set of virtual machines 228, and/or other operating systems, machines, and/or other entities have been installed, instantiated, and/or otherwise operating in the set of host clouds 142 using the guest operating system 272. The duration information can be stored by the cloud management system 104 and/or other logic or service associated with the host cloud or clouds in the set of host clouds 142 in which guest operating system 272 is installed and/or operates.

In aspects, the duration information can be associated with and/or used for purposes of metering and billing the end-user of one or more of the set of virtual machines 228 or other users, based on time of operating system use, resource consumption data, and/or other variables. In aspects, the cloud awareness engine 260 and/or other logic, application, platform, and/or service can be configured to access the kernel hosting record 262 and transmit duration information as well as other data in the set of kernel hosting data 264 to an external, third-party, and/or other metering system 270 for receipt and consumption by that system. In aspects, the metering system 270 can be configured to access subscription information for the subject user via subscription databases or other sources, to generate or process billing records or other subscription events or activities, based on the duration of operation of the guest operating system 272, set of virtual machines 228, set of applications 240, and/or other uses or factors. In aspects, the cloud awareness engine 260 and/or other logic, application, platform, and/or service can communicate with an entitlement engine 140 (FIG. 4) configured to record and administer subscription information for the set of host clouds, with that engine for instance installed in the cloud management system 104 and/or other host or location. The cloud awareness engine 260 can also be connected to metering system 270 via a secure channel or connection, if desired. The same or similar duration, subscription, and/or metering information can also be shared or stored to the cloud management system 104 of the corresponding host cloud, and/or to other locations.

Figure 4:
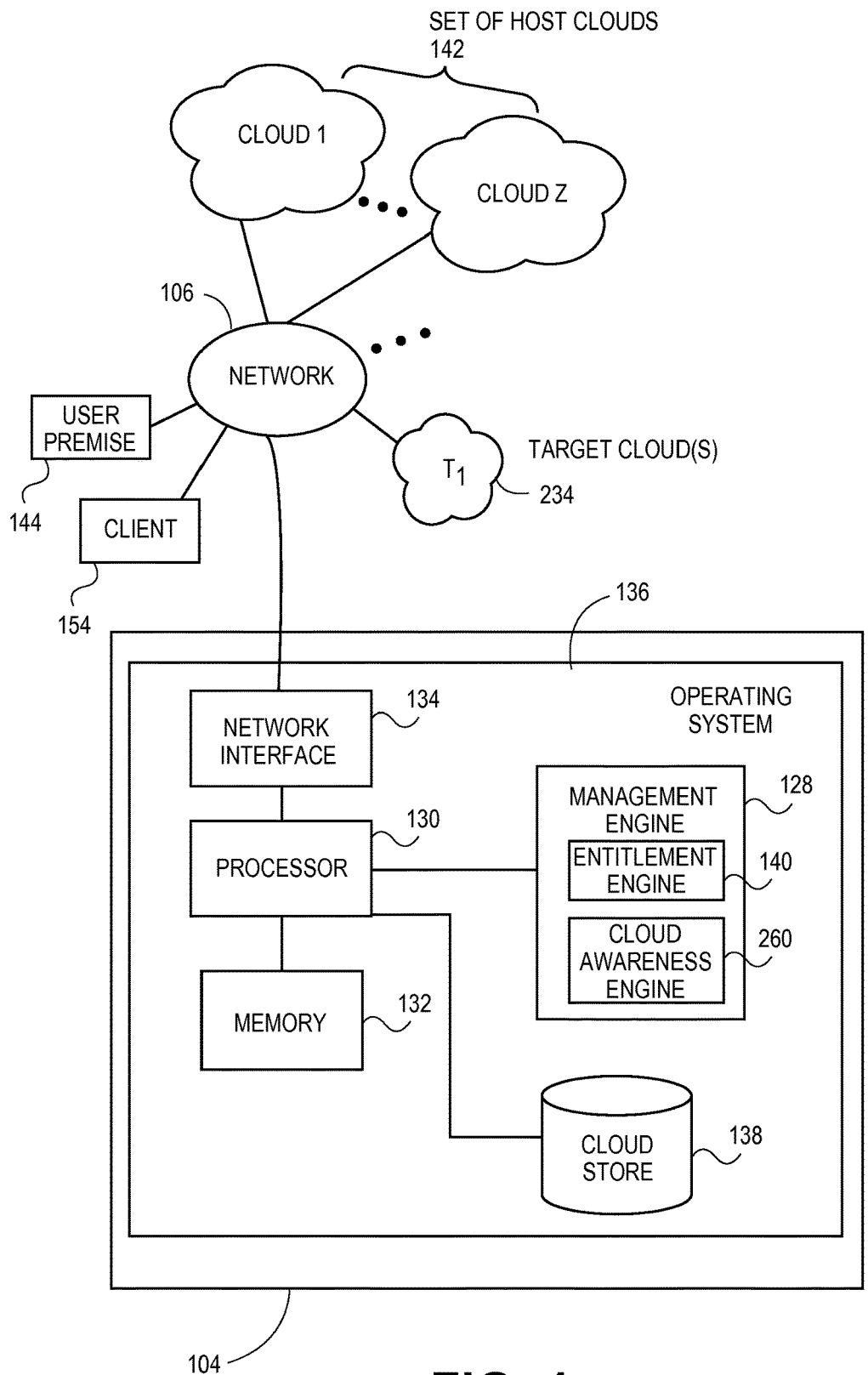
FIG. 4 illustrates an exemplary hardware configuration for a cloud management system and/or other hardware that can support and maintain one or more cloud-based networks, according to various embodiments.

FIG. 4 illustrates an exemplary diagram of hardware and other resources that can be incorporated in a cloud management system 104 configured to communicate with the set of instantiated virtual machines 116, cloud awareness engine 260, entitlement engine 140, set of host clouds 142, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, a management engine 128, an entitlement engine 140, and the cloud awareness engine 260 to execute control logic and control the operation of the set of virtual machines 228 and/or other resources in the set of host clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with other interfaces, applications, machines, sites, services, data, and/or logic. Other configurations of the cloud management system 104, associated network connections, and other hardware, software, and service resources are possible. It may be noted that in embodiments, other hardware machines, platforms, or engines can comprise the same or similar resources as cloud management system 104, or can be configured with different hardware and software resources.

Figure 5:
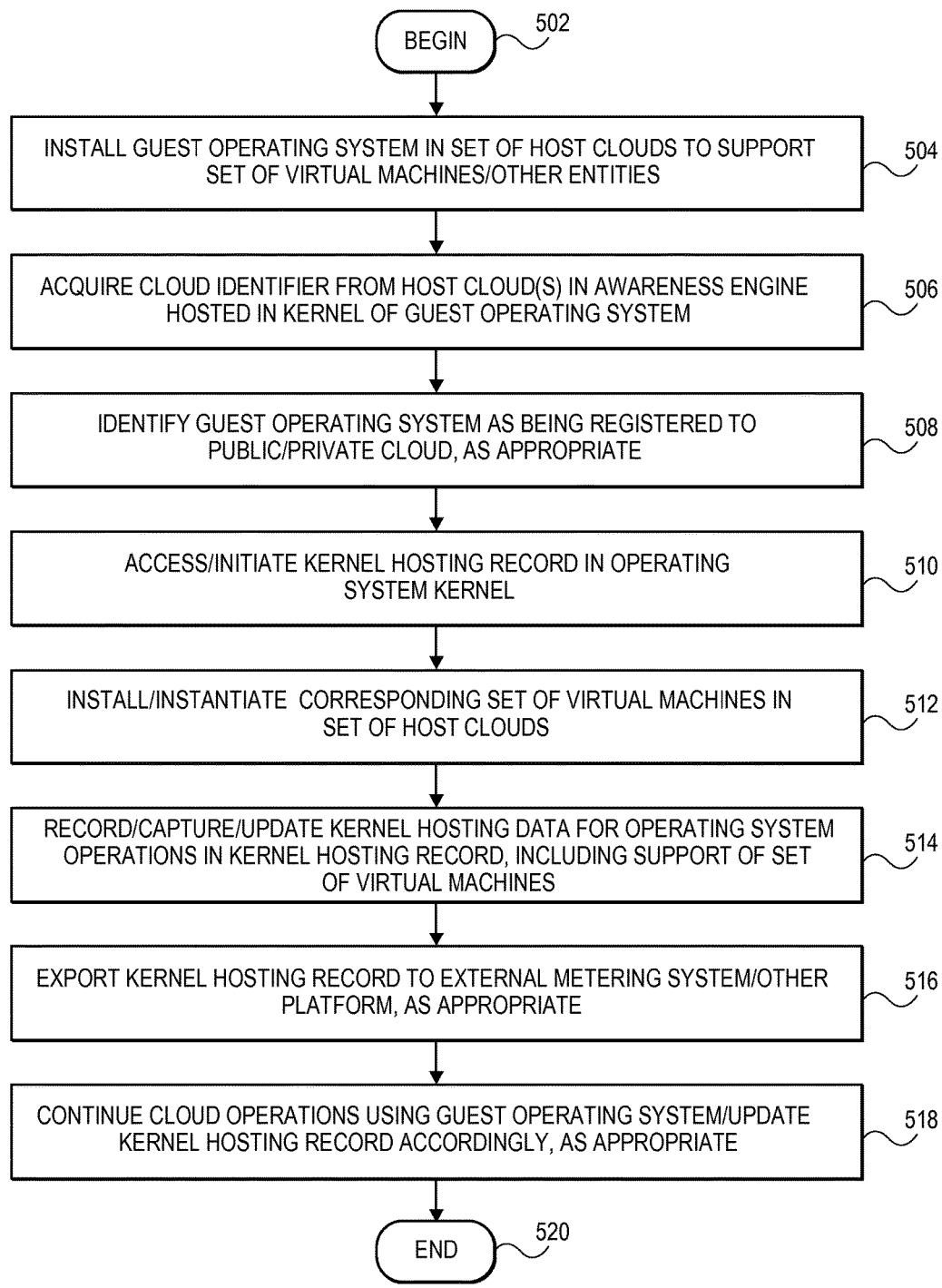
FIG. 5 illustrates a flowchart for the analysis and processing of cloud-related information capture at the kernel level of a cloud-based operating system, according to various embodiments

FIG. 5 illustrates a flowchart of overall processing to perform various cloud-identification and other operations using kernel-based operating system resources, according to various embodiments of the present teachings. In 502, processing can begin. In 504, the guest operating system 272 can be installed or associated with one or more clouds in the set of host clouds 142, to support the operation of the set of virtual machines 228 operating or to be operated in that cloud or clouds.

In 506, the cloud identifier 266 for the cloud or clouds in which guest operating system 272 is installed or operating can be acquired in the cloud awareness engine 260 and/or other logic, application, platform, and/or service hosted in the kernel 270 of the guest operating system 272. In 508, the cloud awareness engine 260 and/or other logic, application, platform, and/or service can identify the guest operating system 272 as being installed or registered in a public cloud and/or a private cloud, as appropriate. In 510, the cloud awareness engine 260 and/or other logic, application, platform, and/or service can access and/or initiate the kernel hosting record 262 in the kernel 270 of the guest operating system 272, including the set of kernel hosting data 264.

In 512, the set of virtual machines 228 scan be installed and/or instantiated in the set of host clouds 142. In 514, the cloud awareness engine 260 and/or other logic, application, platform, and/or service can record, capture, and/or update the set of kernel hosting data 264 related to operation of the guest operating system 272, and/or related information, in the kernel hosting record 262. In aspects, the kernel hosting data 264 can including operations related to the support of the set of virtual machines 228, the set of applications 140, and/or other information or data.

In 516, the cloud awareness engine 260 and/or other logic, application, platform, and/or service can export or transmit the kernel hosting record 262 to a metering system 270, such as an external and/or other metering, billing, or administrative platform or service. In aspects, the kernel hosting record 262 can also or instead be transmitted to other applications or services, including potential third-party, internal, and/or external applications, services, and/or platforms for administrative, billing, or other purposes. In 518, cloud operations in the set of host clouds 142 can continue using the guest operating system 272, with updates to the kernel hosting record 262 accordingly being made, as appropriate. in 520, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
   querying, by a kernel of a guest operating system, for a cloud identifier to identify a host cloud in which the guest operating system is installed, wherein the host cloud comprises a plurality of physical computer clusters that are accessible over a network to deliver computational resources, wherein the guest operating system operates on a machine of a first physical computer cluster of the plurality of physical computer clusters in the host cloud;
   responsive to querying for the cloud identifier to identify the host cloud in which the guest operating system is installed, receiving, by the kernel, the cloud identifier that identifies the host cloud in which the guest operating system is installed;
   determining, by the kernel, duration information indicative of a length of time the guest operating system operates in the host cloud; and
   storing, by the kernel, the cloud identifier and the duration information in a kernel hosting record of the kernel of the guest operating system, wherein the storing is performed at a kernel-space level rather than at a user space level.

2. The method of claim 1, further comprising
   instantiating a set of virtual machines each hosted by an instance of the guest operating system.

3. The method of claim 2, further comprising storing a usage history of the set of virtual machines and the guest operating system.

4. The method of claim 3, further comprising storing data related to the usage history in an exportable kernel hosting record.

5. The method of claim 1, further comprising exporting the kernel hosting record to an external metering system.

6. The method of claim 5, wherein the external metering system is to generate a subscription billing event in view of the kernel hosting record.

7. The method of claim 1, further comprising acquiring an updated cloud identifier in view of a change in the host cloud.

8. The method of claim 1, wherein the host cloud comprises a plurality of host clouds.

9. The method of claim 1, wherein the kernel hosting record comprises an identification of a public class or a private class for the host cloud.

10. The method of claim 1, wherein the cloud identifier comprises a unique publicly registered identification code.

11. A system comprising:
a memory; and
a processor, communicatively coupled to the memory, to:
query, by a kernel of a guest operating system, for a cloud identifier to identify a host cloud in which the guest operating system is installed, wherein the host cloud comprises a plurality of physical computer clusters that are accessible over a network to deliver computational resources, wherein the guest operating system operates on a machine of a first physical computer cluster of the plurality of physical computer clusters in the host cloud;
receive, by the kernel, in response to the query for the cloud identifier to identify the host cloud in which the guest operating system is installed, the cloud identifier that identifies the host cloud in which the guest operating system is installed;
determine, by the kernel, duration information indicative of a length of time the guest operating system operates in the host cloud; and
store, by the kernel, the cloud identifier and the duration information in a kernel hosting record at the kernel of the guest operating system, wherein the storing is performed at a kernel-space level rather than at a user space level.

12. The system of claim 11, wherein the processor is further to instantiate a set of virtual machines each hosted by an instance of the guest operating system.

13. The system of claim 12, wherein the processor is further to store a usage history of the set of virtual machines and the guest operating system.

14. The system of claim 13, wherein the processor is further to store data related to the usage history in an exportable kernel hosting record.

15. The system of claim 11, wherein the processor is further to export the kernel hosting record to an external metering system to generate a subscription billing event in view of the kernel hosting record.

16. The system of claim 11, wherein the processor is further to acquire an updated cloud identifier in view of a change in the host cloud.

17. The system of claim 11, wherein the kernel hosting record comprises an identification of a public class or a private class for the host cloud.

18. The system of claim 11, wherein the cloud identifier comprises a unique publicly registered identification code.

19. A non-transitory computer-readable medium comprising instructions that, responsive to execution by a processing device, cause the processing device to perform operations comprising:
querying, by a kernel of a guest operating system, for a cloud identifier to identify a host cloud in which the guest operating system is installed, wherein the host cloud comprises a plurality of physical computer clusters that are accessible over a network to deliver computational resources, wherein the guest operating system operates on a machine of a first physical computer cluster of the plurality of physical computer clusters in the host cloud;
responsive to querying for the cloud identifier to identify the host cloud in which the guest operating system is installed, receiving, by the kernel, the cloud identifier that identifies the host cloud in which the guest operating system is installed;
determining, by the kernel, duration information indicative of a length of time the guest operating system operates in the host cloud; and
storing, by the kernel, the cloud identifier and the duration information in a kernel hosting record of the kernel of the guest operating system, wherein the storing is performed at a kernel-space level rather than at a user space level.

20. The non-transitory computer-readable medium of claim 19, wherein the kernel hosting record comprises an identification of a public class or a private class for the host cloud.

* * * * *